United States Patent
Germata

(10) Patent No.: US 7,493,817 B2
(45) Date of Patent: Feb. 24, 2009

(54) UNDERGROUND PIPE INSPECTION DEVICE AND METHOD

(75) Inventor: Daniel Thomas Germata, Wadsworth, IL (US)

(73) Assignee: Operations Technology Development, NFP, Des Plaines, IL (US)

( * ) Notice: Subject to any disclaimer, the term of this patent is extended or adjusted under 35 U.S.C. 154(b) by 447 days.

(21) Appl. No.: 11/314,621

(22) Filed: Dec. 21, 2005

(65) Prior Publication Data

US 2006/0288802 A1 Dec. 28, 2006

Related U.S. Application Data

(60) Provisional application No. 60/693,326, filed on Jun. 23, 2005.

(51) Int. Cl.
*G01H 3/00* (2006.01)

(52) U.S. Cl. .......................... 73/592; 73/865.8; 73/855; 324/220

(58) Field of Classification Search ................ 73/865.8, 73/592, 431, 855; 324/219–221; 15/104.03, 15/104.05, 104.09
See application file for complete search history.

(56) References Cited

U.S. PATENT DOCUMENTS

| | | | | | |
|---|---|---|---|---|---|
| 4,862,808 | A | * | 9/1989 | Hedgcoxe et al. | 104/138.2 |
| 4,934,179 | A | * | 6/1990 | Biggerstaff | 73/40.5 R |
| 5,565,633 | A | * | 10/1996 | Wernicke | 73/865.8 |
| 6,154,953 | A | * | 12/2000 | MacKinnon | 29/720 |
| 6,308,362 | B1 | * | 10/2001 | Winiger | 15/104.05 |
| 6,847,207 | B1 | * | 1/2005 | Veach et al. | 324/220 |
| 7,131,344 | B2 | * | 11/2006 | Tarumi | 73/865.8 |
| RE40,515 | E | * | 9/2008 | Kwun et al. | 324/220 |
| 2003/0233894 | A1 | * | 12/2003 | Tezuka et al. | 73/865.8 |
| 2008/0141474 | A1 | * | 6/2008 | Kapustin et al. | 15/104.066 |

\* cited by examiner

*Primary Examiner*—Hezron Williams
*Assistant Examiner*—Samir M Shah
(74) *Attorney, Agent, or Firm*—Mark E. Fejer

(57) ABSTRACT

A method and apparatus for inspecting the walls of an underground pipe from inside the pipe in which an inspection apparatus having a circular planar platform having a plurality of lever arms having one end pivotably attached to one side of the platform, having a pipe inspection device connected to an opposite end, and having a system for pivoting the lever arms is inserted into the underground pipe, with the inspection apparatus oriented with the planar platform disposed perpendicular to the pipe axis. The plurality of lever arms are pivoted toward the inside wall of the pipe, contacting the inside wall with each inspection device as the apparatus is conveyed along a length of the underground pipe.

14 Claims, 8 Drawing Sheets

UNDERGROUND PIPE INSPECTION DEVICE AND METHOD

CROSS REFERENCE TO RELATED APPLICATION

This application claims the benefit of provisional U.S. patent application Ser. No. 60/693,326 filed 23 Jun. 2005.

The U.S. Government has a paid-up license in this invention and the right in limited circumstances to require the patent owner to license others on reasonable terms as provided for by the terms of DOE Cooperative Agreement No. DE-FC26-04NT42266 awarded by the U.S. Department of Energy.

BACKGROUND OF THE INVENTION

This invention relates to a method and apparatus for inspecting the inside walls of underground pipes. More particularly, this invention relates to a method and apparatus for inspecting the entire wall of underground pipes in which the inspection devices for assessing the physical and structural integrity of the walls are conveyed through the pipe.

Utilities are responsible for the regular maintenance and integrity of their underground infrastructure. They usually rely on "smart pigs" or robots for the inspection of these pipelines to determine necessary repairs. These devices are designed to traverse axially through a pipeline and inspect the walls of the pipeline through the use of various inspection techniques. However, there exist numerous obstructions such as valves, offsets, bends, and reductions in diameter within the pipeline that can prevent traversal of the "pig" through the pipeline, thereby precluding the use of "pigs" or robots for inspection of those sections of pipeline having these obstructions. Notwithstanding, the inspection of these pipelines is just as critical as those pipelines which are capable of accommodating a "pig" or robot. Thus, it is apparent that there exists a need for a device which is capable of inspecting pipelines having obstructions which otherwise make difficult or preclude inspection by conventional "pigs" and robots.

SUMMARY OF THE INVENTION

It is one object of this invention to provide a method and apparatus for inspecting the walls of underground pipes which are not readily accessible by conventional pipe inspection devices.

It is one object of this invention to provide a method and apparatus for inspecting the walls of underground pipes which is readily adaptable to pipes of varying internal diameter.

It is one object of this invention to provide a method and apparatus for inspecting the walls of underground pipes which maintains a constant relationship between the walls being inspected and the inspection devices, e.g. sensors.

It is another object of this invention to provide an apparatus for inspecting the walls of underground pipes which can accommodate offsets, valves and bends in the pipe.

It is yet another object of this invention to provide a method and apparatus for inspecting the walls of underground pipes which provides uniform inspection of the walls during axial traversal of the pipe.

These and other objects of this invention are addressed by an apparatus comprising a circular planar platform and at least one lever arm pivotably attached to the platform and having a free end to which may be attached an inspection device, such as a sensor. The lever arm is attached to the platform in an orientation providing a direction of pivoting substantially parallel to the plane of the platform. This device supports and places inspection equipment in contact with the inside diameter of any underground pipeline infrastructure encountered during the inspection process. The device enables the expansion and contraction of the inspection equipment to accommodate a diameter change three times the smallest inspected diameter. The device holds the sensing equipment at a constant angle to the pipeline for all diameters and provides uniform coverage of the pipe by maintaining a constantly changing, equidistant arc length between the sensing equipment for any pipe diameter. The device of this invention provides for the support and/or centering of any number of devices within the pipeline. Used in conjunction with the currently available inspection technologies, and currently available propulsion methods, this device is capable of inspecting "unpiggable" pipelines.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

The fundamental principle of this invention is that the entire diameter of a device can be used as a lever arm for the sensors employed in the inspection of the inside of a pipeline. As the lever arms swing out from the pivot point, the device can accommodate different pipe diameters. The maximum pipe diameter that can be inspected is limited by the length of the lever arm of the device. When the lever arms are rotated a full 180° from the fully closed or contracted position to the fully open or extended position, the maximum diameter, which optimally will be three times the diameter of the device, is reached.

Figure 1:
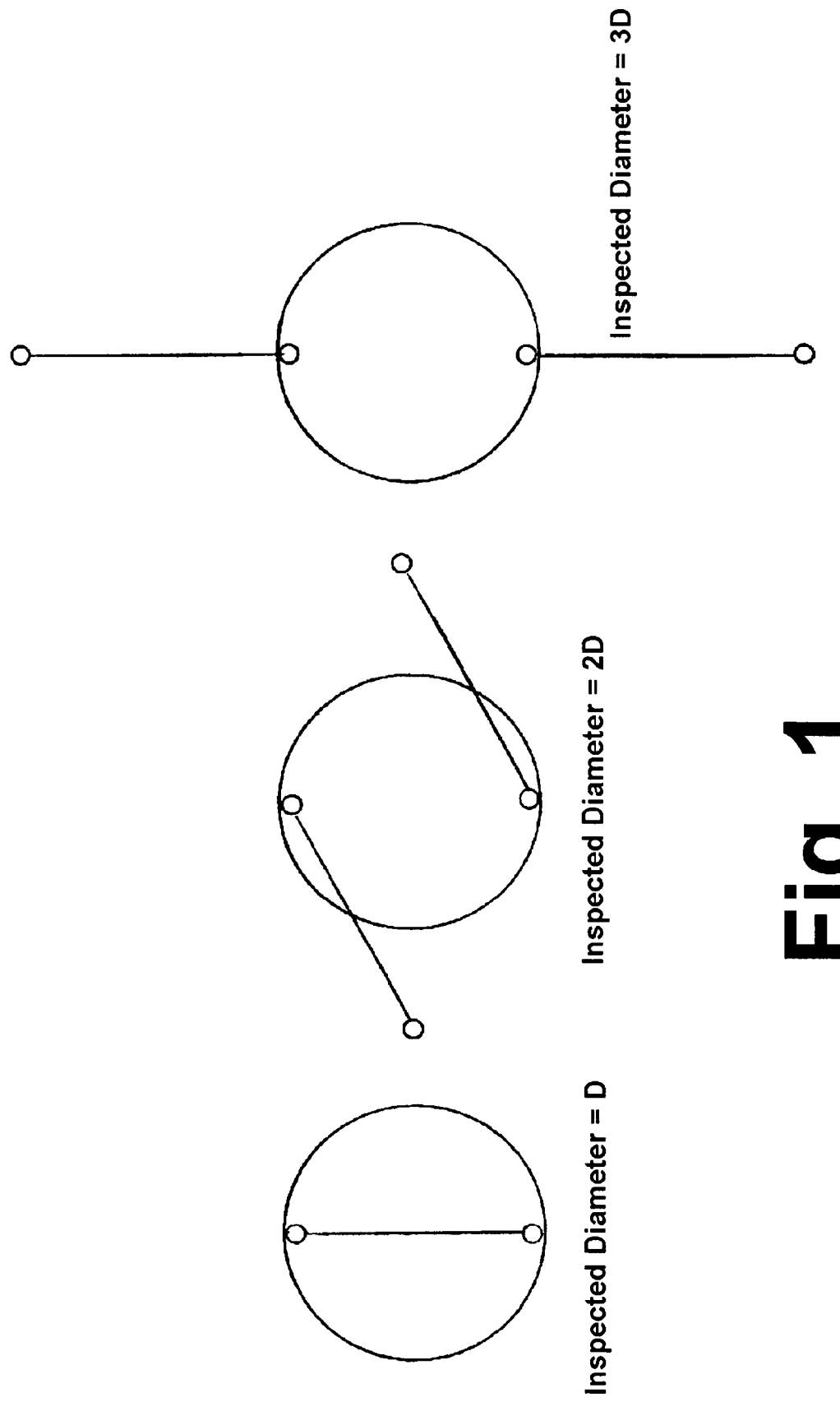
FIG. 1 is a schematic diagram showing the basic concept of this invention.
Figure 2:
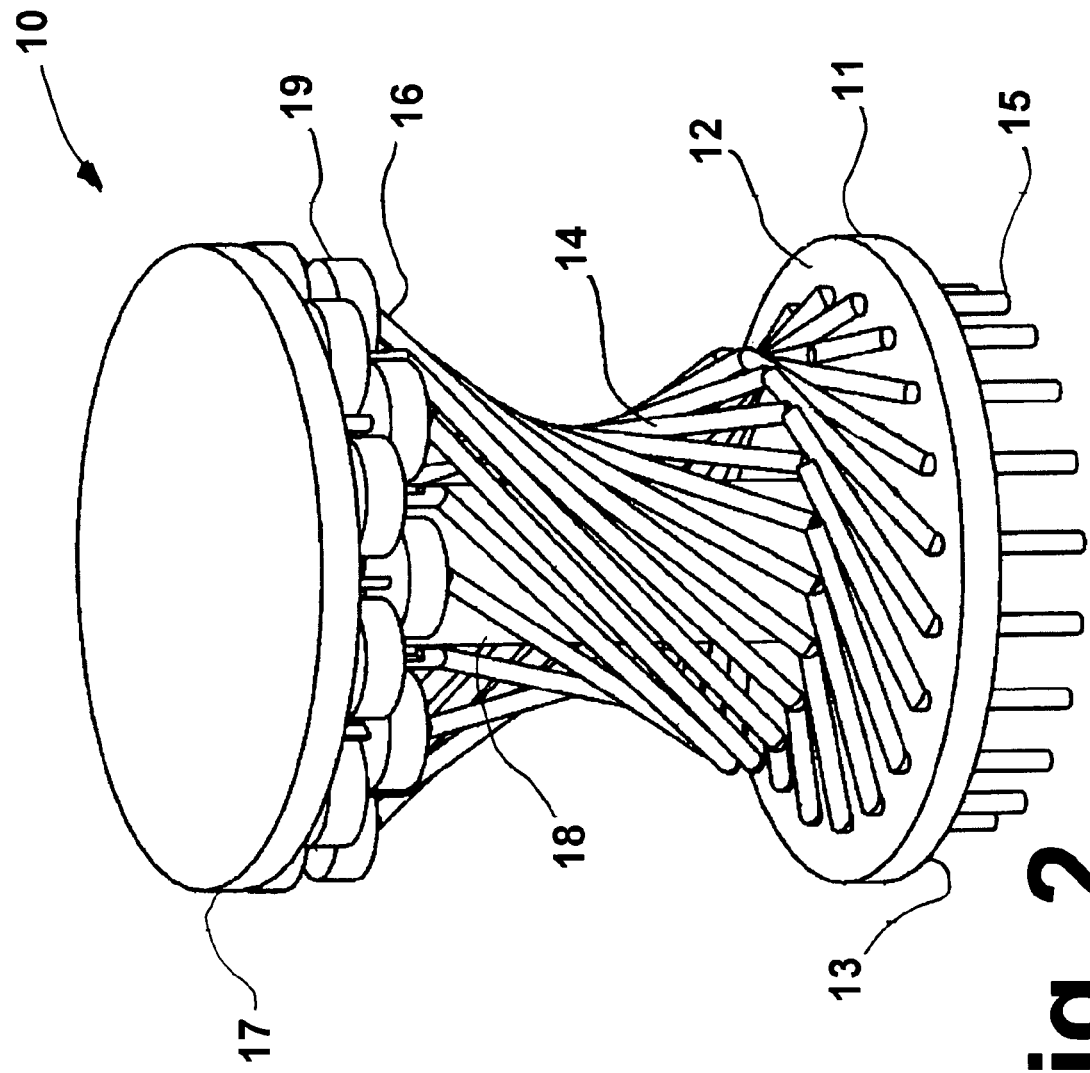
FIG. 2 is a perspective view of an apparatus for inspecting the inside walls of underground pipes in which the lever arms are disposed in a fully contracted position in accordance with one embodiment of this invention.

The schematic of the concept of this invention is shown in FIG. 1. In 2-dimensional space, the device is limited to a single lever arm. However, in 3-dimensional space, it is possible to increase the number of lever arms because they can now be stacked on top of each other as shown in FIG. 2. The 3-dimensional limit of the number of lever arms in accordance with the embodiment shown in FIG. 2 is controlled by the diameter of the arms and the pitch as they rise from the pivot point to the end of the arm.

FIG. 2 shows an inspection apparatus 10 in accordance with one embodiment of this invention comprising a circular planar platform 11 having a first planar side 12 and an opposite second planar side 13, a plurality of lever arms 14 pivotably connected with planar platform 11 on first planar side 12 and pivotable between a contracted position and an expanded position, each said lever arm 14 having a pivot end 15, an inspection device end 16, pipe inspection means 19 for inspecting an inside wall of a pipe connected with inspection device end 16, and pivot means for pivoting lever arms 14. To limit the extent of pivoting of lever arms 14 into the contracting position, the apparatus further comprises a centralized cylindrical lever arm stop 18 having one end connected with planar platform 11. Preferably, centralized cylindrical lever arm stop 18 is hollow, thereby enabling the disposition of electronics for controlling the apparatus (such as the pivoting of the lever arms) therein. In accordance with one embodiment of this invention, a second circular planar platform 17 is attached with the opposite end of centralized cylindrical lever arm stop 18.

Figure 3:
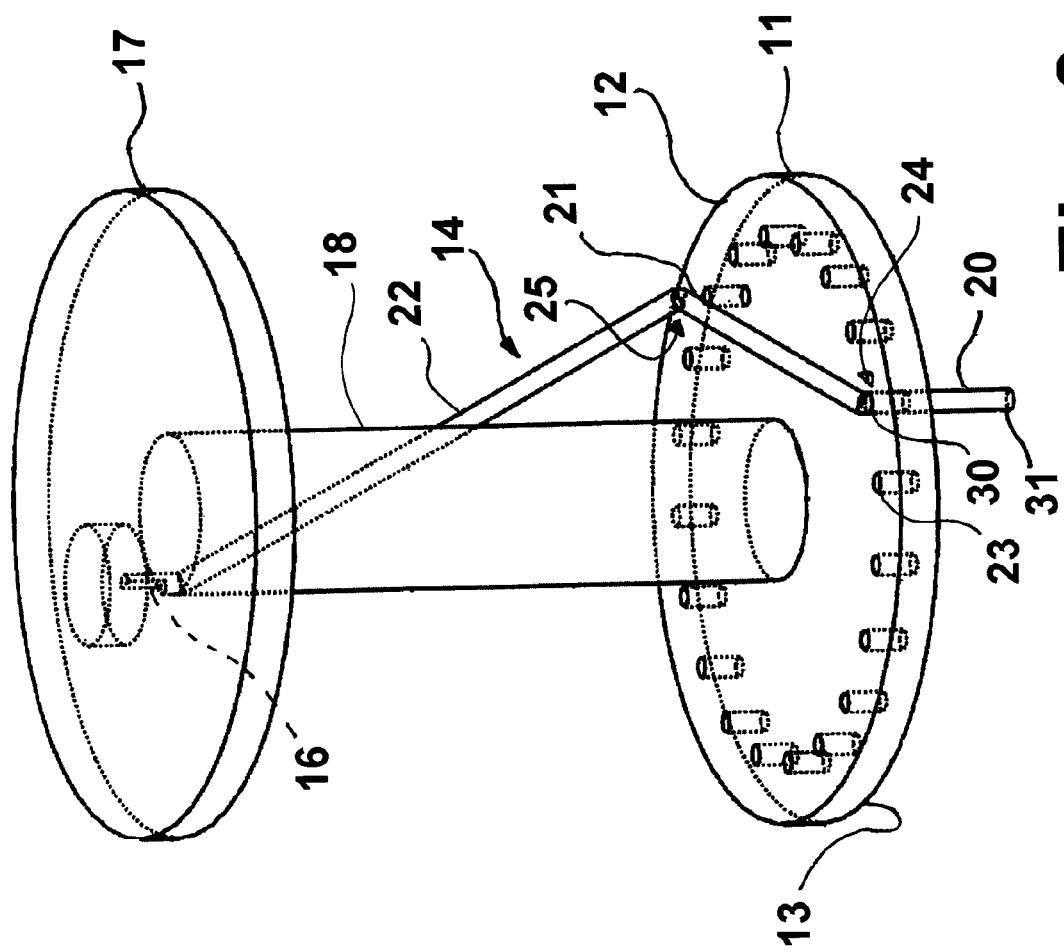
FIG. 3 is a perspective view of the apparatus of FIG. 2, but with only one lever arm in accordance with one embodiment of this invention.
Figure 4:
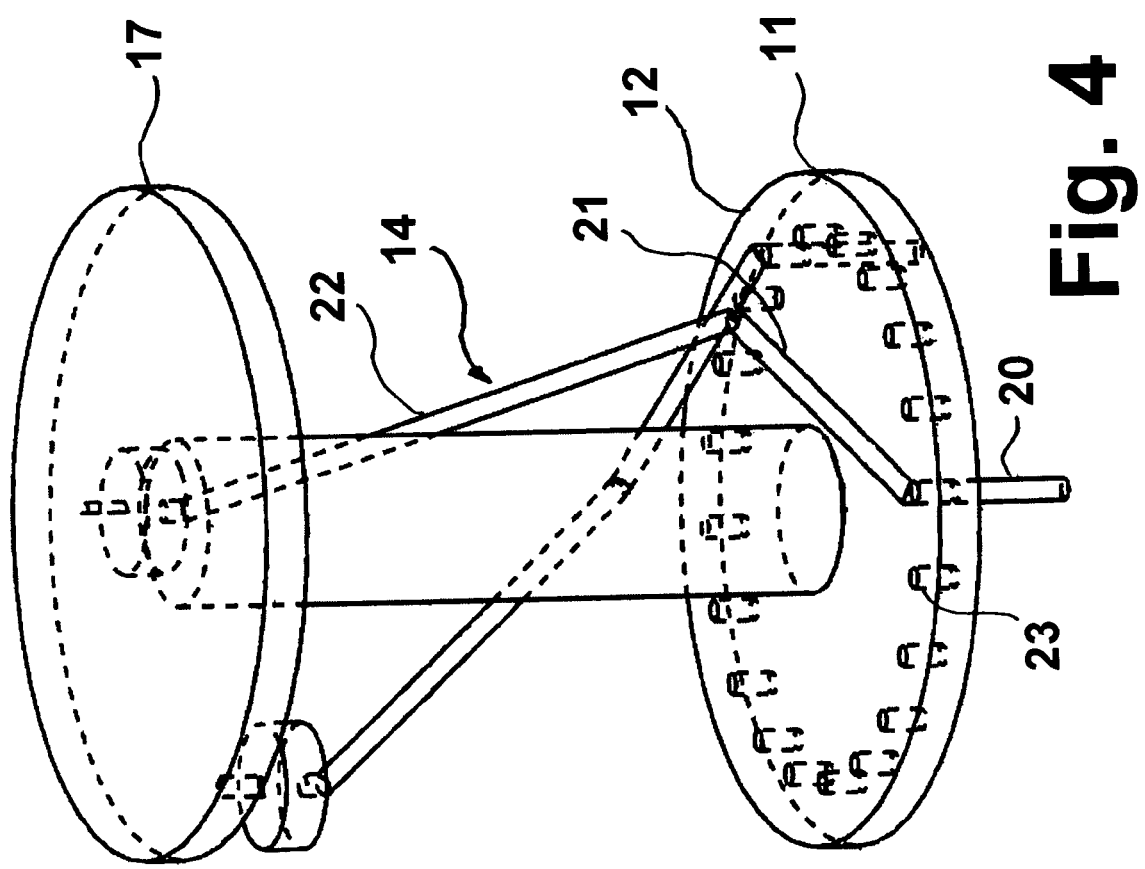
FIG. 4 is a perspective view of the apparatus of FIG. 2, but with two lever arms in accordance with one embodiment of this invention.
Figure 5:
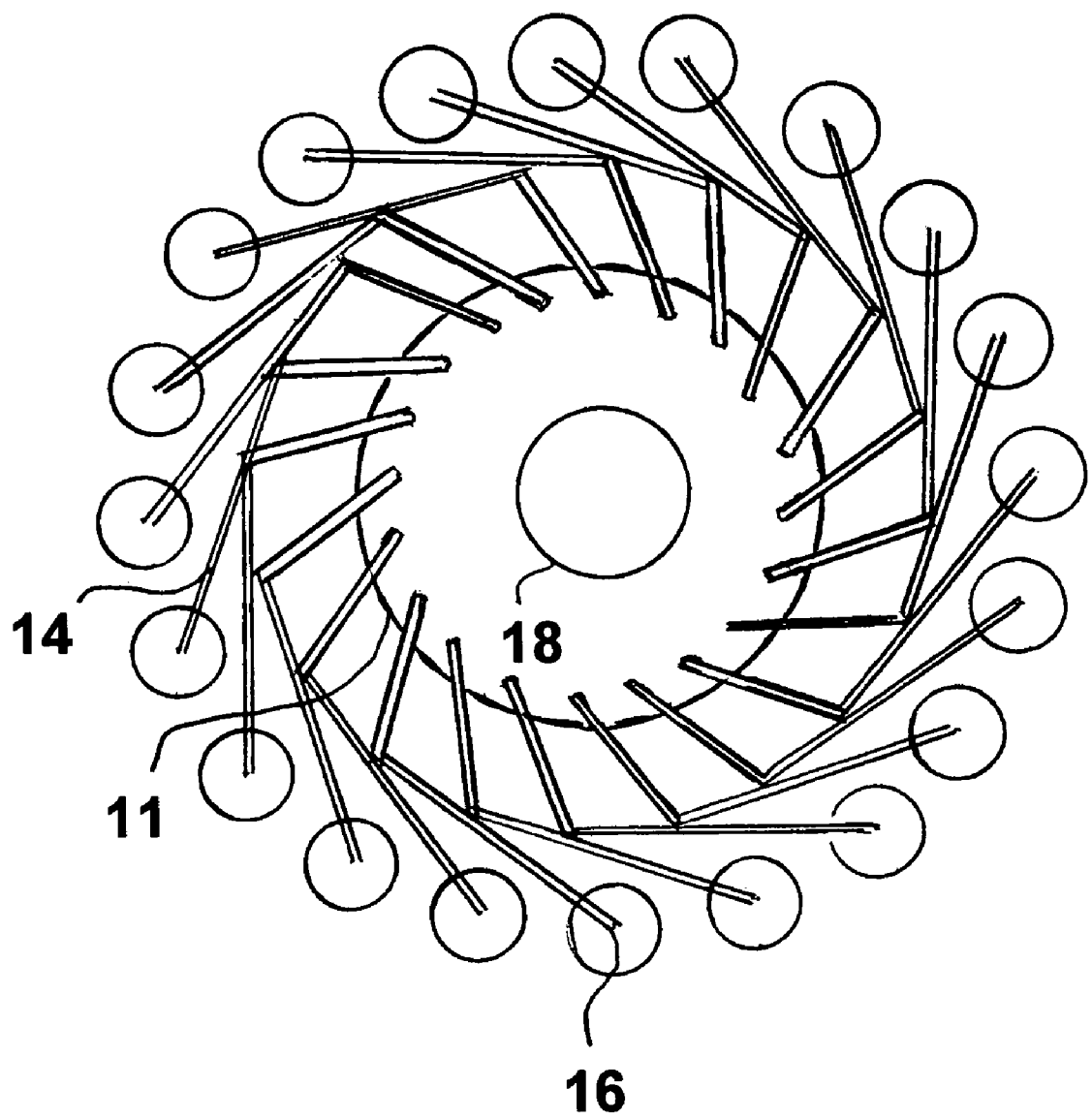
FIG. 5 is a plan view of the apparatus disposed in a pipe in accordance with one embodiment of this invention in which the lever arms are fully expanded.

In accordance with the embodiments of FIGS. 2-5, the lever arms 14 comprise elongated rods having a plurality of angled segments. Lever arms 14 comprise a first angled segment 20 pivotably connected with planar platform 11. First angled segment 20 extends through an opening 23 formed by planar platform 11 and comprises first planar side end 30 extending from first planar side 12 of planar platform 11 and second planar side end 31 extending from second planar side 13 of planar platform 11. Lever arms 14 further comprise a second angled segment 21 connected end-to-end and forming angle 24, which is greater than 90°, with first angled segment 20. In accordance with one particularly preferred embodiment of this invention, lever arms 14 comprise a third angled segment 22 connected end-to-end and forming angle 25 with second angled segment 21. As shown in FIGS. 3-4, third angled segment 22 is also disposed at an angle with respect to the plane of first and second angled segments 20 and 21. FIG. 4 is also provided to show a simplified view of the relationship of multiple lever arms.

It will be appreciated that the lengths of each segment of the lever arms as well as the angles formed between each segment are variable depending upon the diameter of the rods, the diameter of the centralized cylindrical lever arm stop, and the diameters of the pipe to be inspected. However, the underlying principle is that the optimization of the operation of the invention is achieved by pivoting of the lever arms 180° from their fully contracted position for use in smaller diameter pipes to their fully extended position for use in larger diameter pipes. Optimally, the diameter of the largest pipe that can be inspected by a given device is three times the diameter of the smallest pipe that can be inspected by the device. It will also be appreciated that, for a given size device, all of the lever arms are dimensionally the same.

Figure 6:
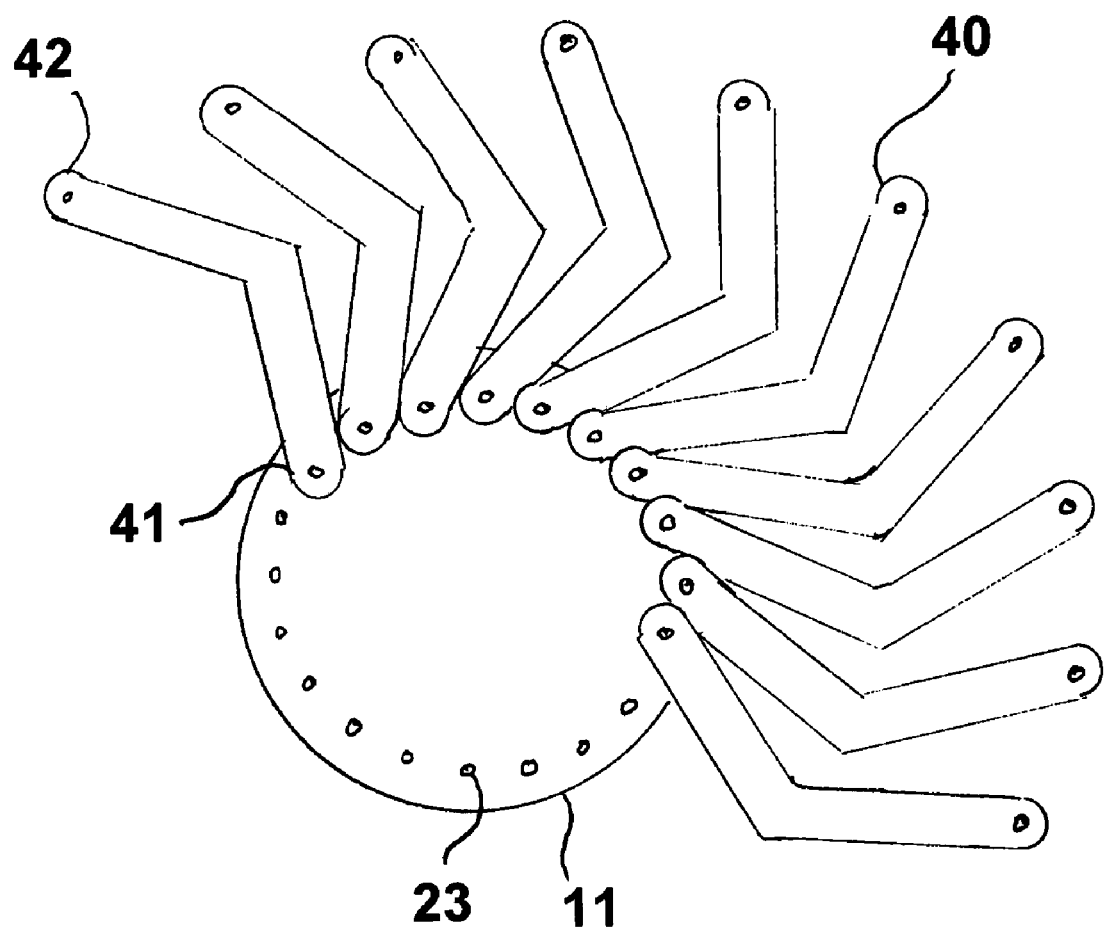
FIG. 6 is a plan view of the apparatus in accordance with one embodiment of this invention employing planar lever arms in an expanded position.
Figure 7:
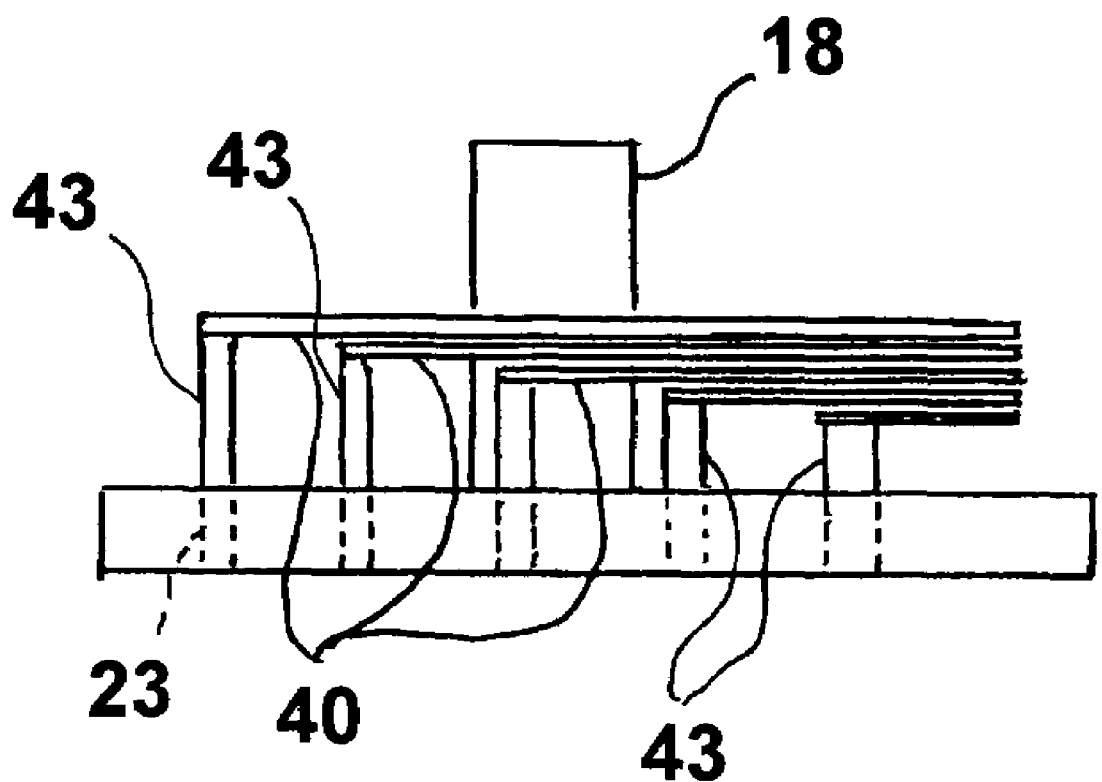
FIG. 7 is a lateral view of the apparatus in accordance with one embodiment of this invention employing planar lever arms, shown in a contracted position.
Figure 8:
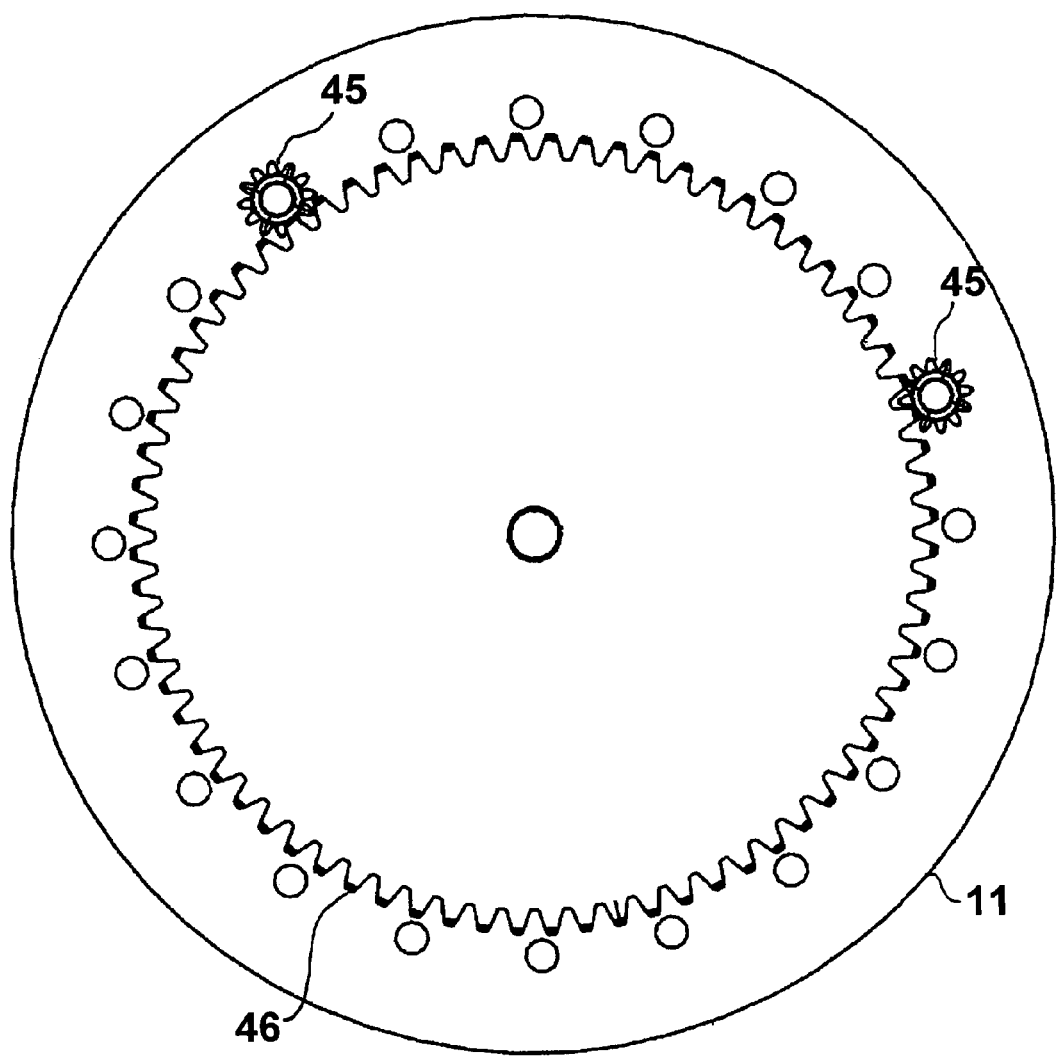
FIG. 8 is a bottom view of the apparatus showing a sun/planetary gear system for pivoting of the lever arms in accordance with one embodiment of this invention.

In accordance with one particularly preferred embodiment of this invention, the apparatus for inspecting the walls of underground pipes comprises planar angled lever arms 40, as shown in the fully extended position in FIGS. 6 and 7, having a pivot end 41 pivotably connected with circular planar platform 11 and a distal inspection device end 42 for accommodation of the inspection means for inspecting the pipe. Each planar angled lever arm 40 is pivotably connected to planar platform 11 by a pivot pin 43. To enable stacking of the planar lever arms 40 in the fully closed position as shown in FIG. 7, starting with the lever arm vertically closest to the first planar side of planar platform 11, each pivot pin 43 is progressively longer, thereby enabling the requisite pivoting of the lever arms without interference from adjacent lever arms.

Pivoting of the lever arms may be accomplished by any number of pivot means, one of which is through the use of gears. In accordance with one embodiment of this invention, the pivot means comprises a sun gear 46 rotatably connected at the center of second planar side 13 of planar platform 11 and engaging a small planetary gear 45 attached, in the embodiments employing elongated rods as lever arms, to the second planar side end of each first angled segment of each lever arm and, in the embodiments employing planar lever arms, to the base of the pivot pin connecting each lever arm with the planar platform. When the sun gear is rotated, all of the planetary gears rotate, thereby pivoting the lever arms. Other pivot means for pivoting the lever arms include pneumatic or electronic control means, and such other pivot means are deemed to be within the scope of this invention.

As shown in FIG. 6, planar lever arms 40 are pivotably connected with planar platform 11 proximate the periphery evenly spaced apart on an arc of about 180°. In accordance with one preferred embodiment of this invention, a second planar platform is provided at the end of the centralized cylindrical lever arm stop as shown in FIG. 2 and a plurality of planar lever arms are pivotably connected on the side of the second planar platform facing the first planar platform evenly spaced over a 180° arc complementary to the 180° arc on the first planar platform. In this manner, upon full extension of the lever arms, there is a full 360° complement of inspection devices contacting the inside walls of the pipeline being inspected.

The method for inspecting the inside walls of underground pipelines containing valves, reductions in diameter, and 90° bends, all of which cannot be navigated with conventional means, in accordance with one embodiment of this invention is initiated by insertion of the device described herein above into the pipeline. Insertion may be accomplished by connection of a launch tube and valve to the pipeline to be inspected. For example, the launch tube may be 4 inches in diameter while the pipeline to be inspected is 10 inches in diameter. The apparatus, with the lever arms in a fully closed position, is inserted into the launch tube. The launch tube may be pressurized and the valve opened to allow access to the pipeline. Through the use of a controlling device, such as a motorized robot to which the inspection apparatus is attached, the device is moved into the pipeline. Once in the pipeline, the sun gear may be rotated through the use of a servo motor, thus rotating the lever arms out to contact the inside wall of the pipeline, at which point the inspection process may proceed. The sensors remain in contact with the inside diameter of the pipeline while the inspection apparatus is traversed axially down the pipe.

If at any time an obstruction is encountered in the pipeline, the lever arms may simply be retracted to the original diameter of 4 inches and proceed through the obstruction. If at any time a smaller diameter pipeline than the original 10-inch diameter pipeline is encountered, the lever arms may be partially retracted to accommodate the new diameter, all the while maintaining the sensor angles constant with the inside diameter of the pipe.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

What is claimed is:

1. A method for inspecting an underground pipe from the inside of said underground pipe comprising the steps of:

inserting an inspection apparatus comprising a circular planar platform having a plurality of lever arms having one end pivotably attached to one side of said platform and having a pipe inspection means connected to an opposite end and having pivot means for pivoting said lever arms into said underground pipe, said inspection apparatus oriented with said planar platform disposed perpendicular to a pipe axis;

pivoting said plurality of lever arms toward an inside wall of said pipe;

contacting said inside wall of said pipe with each said inspection means; and conveying said apparatus axially along said inside of said underground pipe and maintaining contact between each said inspection means and said inside wall.

2. A method in accordance with claim 1, wherein a maximum angle of pivoting for each said lever arm is 180°.

3. A method in accordance with claim 1, wherein said plurality of lever arms are pivoted simultaneously.

4. A method in accordance with claim 1, wherein said inspection apparatus is attached to a robot for conveyance through said underground pipe.

5. A method in accordance with claim 1, wherein said inspection means are maintained at a constant angle with respect to said wall.

6. A method in accordance with claim 1, wherein said inspection means comprises at least one electronic sensor suitable for non-destructive inspection of said underground pipe.

7. An apparatus for underground pipe inspection comprising:

a first circular planar platform having a first planar side and an opposite second planar side;

a plurality of lever arms disposed on said first planar side having a pivotable end pivotably connected with said first planar platform and an inspection end, said lever arms pivotable in a direction substantially parallel to said first planar side;

at least one pipe inspection means for inspecting an inside of said pipe connected with said inspection end; and pivot means for pivoting said lever arms.

8. An apparatus in accordance with claim 7, wherein each of said lever arms comprises an elongated rod having a plurality of angled segments, a first angled segment having a first planar side end and a second planar side end oriented perpendicular to said first and second platform sides and extending through a platform opening formed by said first planar platform proximate a periphery of said first planar platform, and a second angled segment connected end-to-end with said first planar side end of said first angled segment.

9. An apparatus in accordance with claim 8, wherein said elongated rod comprises a third angled segment connected end-to-end at a second angle with a free end of said second angled segment and at an angle with respect to a plane of said first and second angled segments.

10. An apparatus in accordance with claim 8, wherein said pivot means comprises a planetary gear attached with said second planar side end of said first angled segment and a sun gear pivotable around a center of said first planar platform pivotably attached with said second planar side and sized to engage said planetary gear.

11. An apparatus in accordance with claim 7 further comprising a centralized cylindrical lever arm stop having one end connected with said first planar side of said first planar platform.

12. An apparatus in accordance with claim 11, wherein each of said lever arms comprises two planar angled segments.

13. An apparatus in accordance with claim 12 wherein said pivot ends of said lever arms are evenly distributed along a first 180° arc of a first periphery of said first planar platform.

14. An apparatus in accordance with claim 13 further comprising a second circular planar platform connected with an opposite end of said centralized cylindrical lever arm stop, said second planar platform having a second plurality of said lever arms pivotably connected with said second planar platform on a second planar platform side facing said first planar platform, said pivot ends of said second plurality of lever arms evenly distributed over a 180° arc complementary to said first 180° arc along a second periphery of said second planar platform.

* * * * *